May 17, 1966 J. L. POAGE ETAL 3,251,474
SEDIMENT TRAP FOR FUEL TANK
Filed Aug. 3, 1962
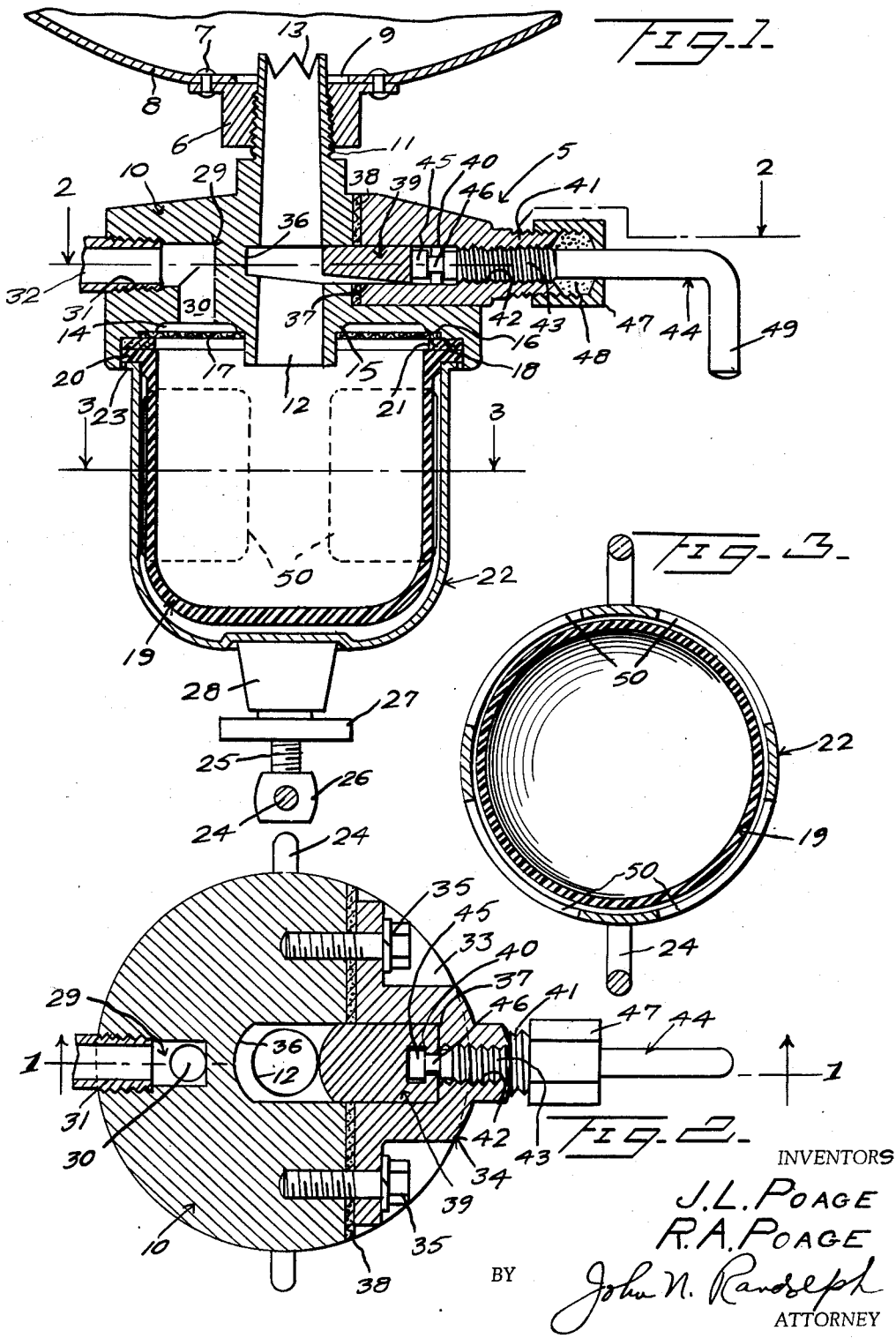
INVENTORS
J. L. POAGE
R. A. POAGE
BY John N. Randolph
ATTORNEY

United States Patent Office 3,251,474
Patented May 17, 1966

3,251,474
SEDIMENT TRAP FOR FUEL TANK
Jesse L. Poage and Robert A. Poage, both of
R.R. 2, Perry, Mo.
Filed Aug. 3, 1962, Ser. No. 214,730
2 Claims. (Cl. 210—418)

This invention relates to a trap for use with a fuel tank of an internal-combustion engine for separating sediment and water from the liquid fuel passing from the tank and for screening the fuel during its passage through the trap.

A primary object of the invention is to provide a sediment trap which may be quickly and effectively cleaned without disconnecting the trap from the fuel tank or from a fuel line, leading from the trap, to thereby eliminate wear on the threaded fittings which frequently causes leakage.

Another object of the invention is to provide a sediment trap having a passage leading from the fuel tank which is so constructed as to provide a substantially unobstructed passageway through which large particles of sediment can be withdrawn from the fuel tank with the liquid fuel and deposited in the trap bowl, and from which said particles may be readily removed, to thus maintain the fuel tank in a clean condition.

A further object of the invention is to provide a sediment trap including a trap bowl which is sufficiently elastic or resilient to prevent breakage of the bowl in the event that a liquid freezes therein, and which is preferably transparent so that the contents of the bowl can be readily viewed to determine when cleaning thereof is desirable.

A further object of the invention is to provide a sediment trap having a novel means for supporting the elastic or resilient bowl in a manner to effectively prevent leakage.

Still another object of the invention is to provide a sediment trap which is so constructed that it may readily replace conventional sediment traps of liquid fuel tanks of motor vehicles, without requiring modification or changes in the fuel tank.

Various other objects and advantages of the invention will hereinafter become more fully apparent from the following description of the drawing, illustrating a presently preferred embodiment thereof, and wherein:

FIGURE 1 is a substantially central vertical sectional view of the sediment trap taken along the line 1—1 of FIGURE 2;

FIGURE 2 is a horizontal sectional view through the sediment trap, taken substantially along the line 2—2 of FIGURE 1, and FIGURE 3 is a horizontal sectional view through a part of the sediment trap, taken substantially along a plane as indicated by the line 3—3 of FIGURE 1.

Referring more specifically to the drawing, the sediment trap in its entirety and comprising the invention is designated generally 5 and includes an internally threaded collar 6 which is secured by fastenings 7 to the underside of a bottom portion 8 of a conventional liquid fuel tank, around an opening 9 thereof.

The sediment trap 5 includes a body 10 having an upwardly projecting tubular extension or nipple 11 which is externally threaded to threadedly engage in the collar 6. Said tubular extension or nipple 11 and the body 10 have a passage 12 which extends from end-to-end therethrough, the upper end of which opens into the fuel tank 8 through the opening 9, at the upper end of the extension or nipple 11, which is notched, as seen at 13. The lower end of the passage 12 opens downwardly from the lower end of the body 10 and said passage 12 is flared from the upper to the lower end thereof, as clearly illustrated in FIGURE 1.

The underside of the body 10 is recessed around and above the lower end of the passage 12 to provide an annular downwardly opening channel 14. An inner annular shoulder 15 is provided between the channel 14 and passage 12 and an outer annular shoulder 16 is formed in the body 10 around the channel 14. An annular screen 17 of mesh wire fabric has its inner and outer edges abutting against the the shoulders 15 and 16, respectively, and is disposed to cover the open bottom of the channel 14. The body 10 has an annular shoulder 18 disposed below and around the shoulder 16. A trap bowl 19 has an annular outturned flange 20 at its upper end which seats against an annular sealing gasket 21 which, in turn, seats against the downwardly facing shoulder 18, and extends inwardly therefrom so as to bear against a peripheral portion of the screen 17 for supporting said screen against the shoulders 15 and 16.

A cage 22 is disposed around and spaced from the bowl 19 and has an outturned annular flange 23 at its upper end which abuts against the underside of the bowl flange 20. A bail 24 is swingably suspended from the body 10 and is disposed loosely around the cage 22. A screw 25 has an apertured head 26 which fits slidably and turnably on the intermediate portion of the bail 24. The screw 25 normally extends upwardly from the head 26 and supports a nut 27 which is threadedly mounted thereon. A thimble 28 is swivelly supported on the nut 27 and seats against the bottom of the cage 22 for supporting the cage with its flange 23 pressed tightly against the bowl flange 20 for supporting the bowl 19 sealed against the sealing gasket 21. Thus, as seen in FIGURE 1, the lower larger end of the passage 12 discharges directly into the trap bowl 19.

The body 10 is provided with an angular passage 29 including an inlet end 30 which opens downwardly into the channel 14 above the screen 17, and an outlet end 31 which opens outwardly of a part of the periphery of the body 10 and to which is adapted to be connected an end of a fuel line 32 which leads from the trap 5 to a carburetor, not shown.

The body 10 has a recessed portion 33 which is spaced from the outlet passage 29 and disposed above the channel 14 to receive a valve housing 34 which is secured thereto by fastenings 35, as seen in FIGURE 2. A valve seat 36 is formed in the body 10, crosswise of the passage 12, and a part of said passage extends through said valve seat. The valve housing 34 has a socket 37 which opens toward and registers with the valve seat 36. A sealing gasket 38 is disposed between the body 10 and housing 34 and around the open adjacent ends of the valve seat 36 and socket 37 for sealing the body and housing to one another. A valve 39 slidably engages in the socket 37 and valve seat 36 and has a T-shaped recess 40 at its rear end.

The housing 34 has an externally threaded extension 41 on its outer side and a threaded bore 42 extends therethrough and opens into the outer end of the socket 37 to receive a threaded part 43 of a valve stem 44. The inner end of the valve stem 44 has a head 45 which fits turnably in the enlarged part of the recess 40, and a neck 46 which fits turnably in the restricted part of said recess, for swivelly connecting the valve stem to the valve 39. A nut 47 containing a packing 48 is threadedly mounted on the threaded extension 41 and the valve stem 44 extends rotatably and slidably through said nut and packing and has a handle 49 at its outer end.

The valve 39 in its fully retracted position seats in the socket 37 to completely expose the passage 12, as seen in FIGURES 1 and 2. By rotating the valve stem 44, the valve 39 can be advanced to seat snugly in the valve seat 36 to completely seal the passage 12. When disposed in said last mentioned closed position, the nut 27 can be loosened to disengage the thimble 28 from the cage 22 so that the bail 24 can be swung upwardly to permit ready detachment of the cage 22 and bowl 19 from the body 10 so that the bowl can be cleansed to remove sediment and water therefrom, all of which can be readily accomplished without disturbing the connection of the body 10 to the tank 8 or fuel line 32. If desired and while the bowl and cage are detached from the body 10, the valve 39 can be opened momentarily to flush out the passage 12. With the bowl and cage applied and with the valve 39 in a fully open position, as seen in FIGURE 1, the passage 12 will provide a large unobstructed flow from the tank 8 to the bowl 19 so that large particles of sediment, which would otherwise collect in the tank 8 may escape therefrom and be collected in the bowl 19. The notched upper end 13 of the passage 12 will prevent said passage being clogged by any foreign object within the tank 8 and which might come to rest upon said notched end 13. The liquid fuel or gasoline, not shown, after discharging from the passage 12 into the bowl 19 will pass upwardly through the screen 17 into the channel 14 and thence through the outlet passage 29 into the fuel line 32. Due to the downwardly flared shape of the passage 12, any pieces of sediment capable of entering said passage will pass therethrough and discharge into the bowl 19, so that said passage cannot be obstructed.

The bowl 19 is formed of a transparent elastic or resilient material, such as a plastic, so that the bowl may yield or be distorted to prevent breakage thereof in the event of freezing of water in the bowl and which constitutes a serious fire hazard where conventional glass bowls are utilized. An elastic or resilient bowl is rendered possible due to the use of the rigid cage 22 which supports said bowl by engagement with only the flange 20 thereof, and which cage is otherwise spaced sufficiently from the bowl to allow a necessary expansion or distortion thereof. The rigid cage 22 is provided with openings 50 through which the contents of the bowl 19 can be observed.

Various modifications and changes are contemplated and may be resorted to, without departing from the function or scope of the invention as hereinafter defined by the appended claims.

We claim as our invention:

1. A sediment trap comprising a body member, means adapted to connect said body member to the underside of a liquid fuel tank for supporting the body member therebeneath, a sediment bowl, means detachably supporting said sediment bowl against an underside of the body member and in sealed relation thereto, said body member having a large passage including an upper inlet end adapted to open upwardly into the fuel tank and a lower outlet end discharging into said bowl, said body member having an outlet passage including a downwardly opening inlet end disposed above the lower discharge end of said first mentioned passage and communicating with the bowl and an outlet end opening laterally outward of the body and adapted to be connected to a fuel line, said first mentioned passage being flared from the upper inlet end thereof to its lower discharge end to provide an unobstructed flow therethrough, and manually operated valve means supported by said body for completely closing said first mentioned passage in one position of the valve means and for completely exposing said first mentioned passage in a fully open position of the valve means, said bowl being elastic, and said bowl supporting means contacting the bowl only at the rim thereof to permit expansion of the bowl to prevent breakage thereof due to freezing of the bowl contents.

2. A sediment trap including a body adapted to be connected to and supported beneath a liquid fuel tank, a bowl detachably supported by and disposed beneath said body in liquid-tight engagement therewith, said body having an inlet passage extending from top to bottom therethrough including an inlet end adapted to open upwardly into the fuel tank and an outlet end discharging downwardly into said bowl, and said body having an outlet passage including an inlet end opening downwardly thereof into the bowl above the outlet end of said inlet passage and an outlet end opening laterally outward of the body and adapted to be connected to the end of a fuel line, said inlet end of the inlet passage being smaller than any other part of said inlet passage to provide an unobstructed flow therethrough between said inlet end and said outlet end, said bowl being elastic, and said bowl supporting means contacting the bowl only at the rim thereof to permit expansion of the bowl to prevent breakage thereof due to freezing of the bowl contents.

References Cited by the Examiner

UNITED STATES PATENTS

| 1,612,526 | 12/1926 | Mueller | 210—444 |
| 1,688,152 | 10/1928 | Pierson | 210—444 X |
| 1,730,360 | 10/1929 | Fisher | 210—311 X |
| 2,503,566 | 4/1950 | Scott | 210—311 X |
| 2,646,884 | 7/1953 | Findley | 210—311 X |
| 2,932,398 | 4/1960 | Korte | 210—452 X |
| 3,105,042 | 9/1963 | Roosa | 210—444 X |

FOREIGN PATENTS 858,139   1/1961   Great Britain.

REUBEN FRIEDMAN, *Primary Examiner.*

HERBERT L. MARTIN, *Examiner.*

F. W. MEDLEY, *Assistant Examiner.*